S. Parsons.
Making Weavers' Shears.
Nº 774.  Patented Jan. 7, 1838.
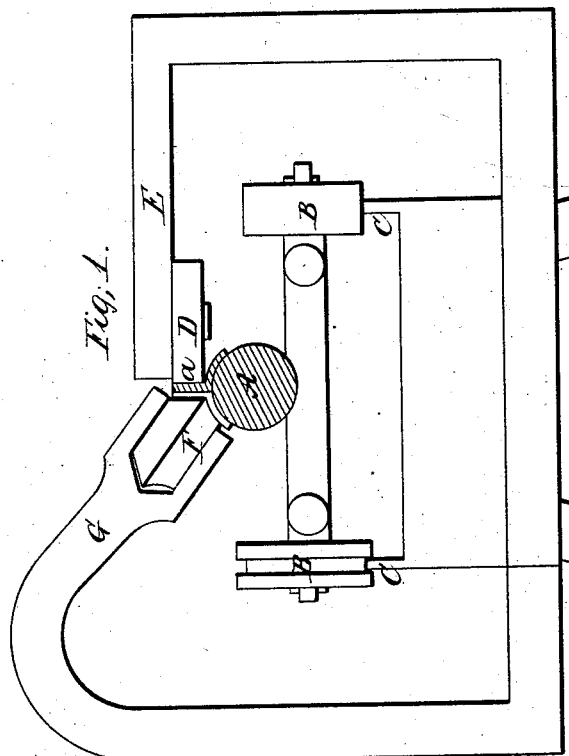
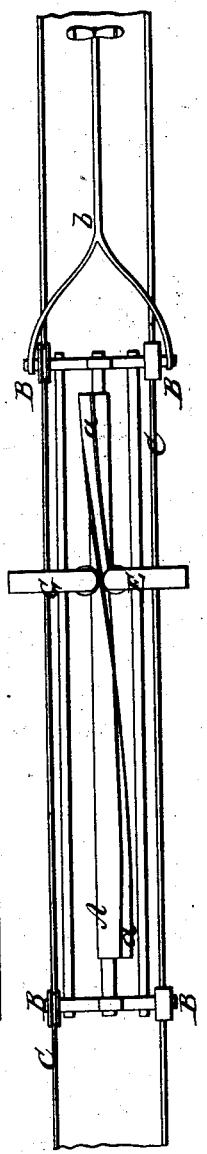

UNITED STATES PATENT OFFICE.

SETH PARSONS, OF HOOSICK FALLS, NEW YORK.

MODE OF MANUFACTURING FLYING SHEARS FOR THE PURPOSE OF SHEARING WOOLEN CLOTH.

Specification of Letters Patent No. 774, dated June 7, 1838.

*To all whom it may concern:*

Be it known that I, SETH PARSONS, of Hoosick Falls, in the county of Rensselaer and State of New York, have invented a new and improved mode of manufacturing the flying shears which are to be set spirally upon cylinders for the purpose of shearing woolen cloth; and I do hereby declare that the following is a full and exact description thereof.

The usual mode of attaching the flying shears to the cylindrical shaft, has been to make grooves to receive them in a solid shaft, where they have been secured by riveting or otherwise, but always in a manner which has rendered this removal for grinding, or repair, inconvenient and difficult; while in my mode of forming them they are attached to and removed from the cylinder, with great facility and are more securely fixed thereon, than by any other known mode. I make the plate which is to form the blade of my shear, of such width as that it may be bent at right angles longitudinally, allowing one part to constitute a flanch by which it is to be screwed on to the cylinder, and the other to constitute the blade by which the shearing is to be effected; and the intention of my machine is to give the proper spiral twist to the blade, at the same time that it gives to the flanch the exact form required to adapt it to the cylinder.

I prepare a shaft somewhat longer than the blade which is to be formed upon it; this shaft consists of a cylinder of the same diameter with that upon which the blades are to be finally fixed. Upon this shaft I form a spiral wing, bending around it precisely as the shear is to bend around its shaft, and having a face rising at right angles, so that when the blade to be formed is made to fit by its flanch part to the shaft, and by its operating part to the face of the wing, it will be of the exact form required. The plates of the shears I usually make about an inch and an eighth in width, and about three sixteenths of an inch in thickness, laid with steel on one edge, which may be about one half of the width and thickness of the plate; I then bend it, by means of swages, or otherwise, and it is ready for the operation of the machine.

In the accompanying drawing Figure 1, represents an end view of the machine, and Fig. 2, a top view of it, but drawn to a much smaller scale.

A, is the shaft, the ends of which run on gudgeons supported by standards from the carriage, but omitted in Fig. 1, as not necessary to be shown; a, is the wing, which is attached firmly to the shaft, and which is seen twisting around it in Fig. 2.

B, B, are the wheels of a car upon which the car is supported, and C, C, ways upon which it is to run, being drawn forward by bar, b, b.

D, is a roller supported on the arm E, which roller bears against the back of the wing a; and F, is a roller supported by the arm G, the upper part of which roller is conical, and embraces the cutting blade of the shear between it and the wing a; while the lower part is curved, and embraces the flanch part between it and the shaft A. In order to hold the plate as the car is drawn forward, I make a hole, or mortise, in the end of it, just below the flanch of the shear, and bend the end of the latter so that it may hook into the hole, or mortise, which will hold it firmly.

The plate, made red hot, is hooked in its place, and by being drawn through the machine is instantaneously formed, in the most perfect manner. It may also be hardened, if desired, as it is drawn through, by passing it into water, or by allowing water to run upon it.

What I claim as my invention in the foregoing machine is—

The manner in which I have constructed the same, so that by the combined action of the rollers and the winged shaft in the way herein described, the flying shear receives the exact form and set necessary to its being affixed to the shaft.

SETH PARSONS.

Witnesses:
LINTON THORN,
W. THOMPSON.